Figure 1:
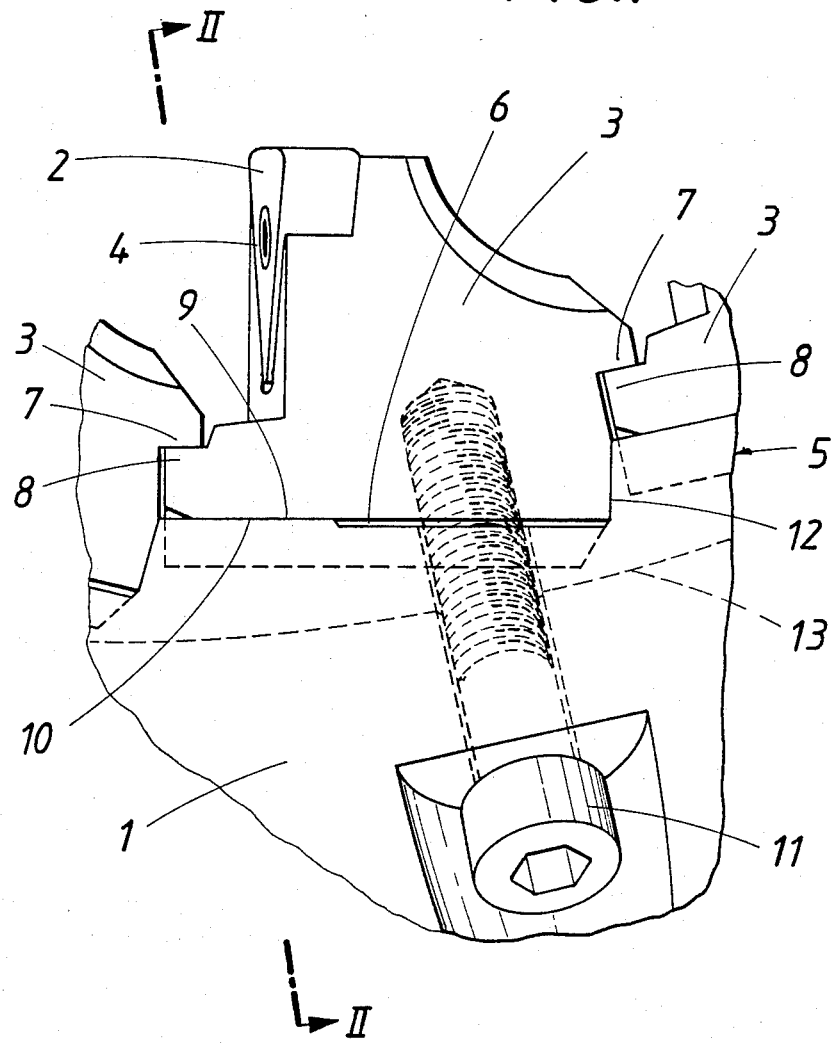

United States Patent [19]

Kirchberger

[11] Patent Number: 4,551,043
[45] Date of Patent: Nov. 5, 1985

[54] INSERTED TOOTH CUTTER

[75] Inventor: Peter Kirchberger, Haag, Austria

[73] Assignee: GFM Gesellschaft Für Fertigungstechnik und Maschinenbau Gesellschaft m.b.H., Steyr, Austria

[21] Appl. No.: 620,144

[22] Filed: Jun. 13, 1984

[30] Foreign Application Priority Data

Jul. 5, 1983 [EP] European Pat. Off. ...... 83 89 0109.8

[51] Int. Cl.⁴ .............................................. B26D 1/00
[52] U.S. Cl. ........................................ 407/43; 407/35; 407/52
[58] Field of Search ................. 407/35, 40, 42, 43, 407/51, 52

[56] References Cited

U.S. PATENT DOCUMENTS

| 1,077,271 | 11/1913 | Gorton | 407/52 |
| 2,840,887 | 7/1958 | Donnelly | 407/42 |
| 3,023,486 | 3/1962 | Bogner | 407/42 |
| 3,242,553 | 3/1966 | Bogsten | 407/52 |
| 4,488,839 | 12/1984 | Wermeister et al. | 407/43 |

FOREIGN PATENT DOCUMENTS 2515937 10/1976 Fed. Rep. of Germany .

Primary Examiner—Leonidas Vlachos
Attorney, Agent, or Firm—Kurt Kelman

[57] ABSTRACT

An inserted tooth cutter comprises a disc-shaped cutter body, which is provided at its periphery with an annular series of tooth holders, each of which is individually fixed and adapted to receive at least one platelike cutting tooth. In order to ensure that the tooth holders will be mounted in a stable position with an optimum utilization of space, each tooth holder is fixed by means which force the tooth holder against the cutter body in a generally radial direction and each tooth holder has at one end a shoulder-forming extension bearing on a mating extension of an adjacent tooth holder and has adjacent to the other end a bottom surface portion bearing on a mating surface of the cutter body.

9 Claims, 2 Drawing Figures

INSERTED TOOTH CUTTER

This invention relates to an inserted tooth cutter comprising a disc-shaped cutter body provided at its periphery with an annular series of tooth hoders, each of which is adapted to be individually fixed and to receive at least one platelike cutting tooth.

Compared to inserted tooth holders in which the tooth plates are directly inserted in recesses of the cutter body, an inserted tooth cutter which is provided with separate tooth holders for fixing the platelike teeth affords the advantage that the teeth can be snugly fitted in pockets formed in the tooth holders, which provide suitable backing surfaces, and that the tooth plates can be backed in a desirable manner within small space. Besides, the tooth holders may be made of a material which is particularly suitable for taking up forces from the teeth to be backed, and the tooth holders also afford protection for the cutter body. Moreover, the use of separate tooth holders permits a provision of the inserted tooth cutter with a large number of teeth so that the inserted tooth cutter has a long edge life, and also permits a replacement of the tooth holders so that the number and distribution of the teeth can be changed and the inserted tooth holder can be used to machine various profiled shapes.

To ensure a machining to a high finish, the tooth holders must be exactly fixed in a stable position in the cutter body. For this reason the tooth holders of the known inserted tooth cutters are wedged in radial grooves formed in the cutter body although this requires higher manufacturing costs and increases the space requirement and reduces the tooth capacity particularly of internally cutting inserted tooth cutters.

It has also been proposed to provide the cutter body at its periphery with an annular series of segmentshaped tooth holders, which are separated by radial gaps and have a flange that is parallel to the plane defined by the flight circle of the teeth, and a cylindrical backing shoulder that is transverse to said flange, and to mount the tooth holders on an annular peripheral shoulder of the cutter body and to fix them to the cutter body by axial fixing screws extending through said flange. In such inserted tooth cutter the tooth holders are not adequately supported because the cutting forces, which act mainly in the peripheral direction, and the tilting moment, which acts on the tooth holders during the cutting operation, can be taken up only by the frictional joint between the flange and the annular shoulder. Besides, the flanges of the tooth holders are so dimensioned that they are mounted on the annular shoulder mainly on one side of the tooth holders so that only a relatively small, eccentrically disposed bearing surface is available for taking up radial loads.

It is an object of the invention to eliminate these disadvantages and to provide an inserted tooth cutter which is of the kind described first hereinbefore and which involves only a low structural expenditure and ensures a reliable and stable mounting of the tooth holders and permits the tooth holders to be arranged with an optimum utilization of space.

This object is accomplished in accordance with the invention in that each tooth holder is forced against the cutter body in a generally radial direction and each tooth holder has at one end a shoulder-forming extension bearing on a mating extension of the adjacent tooth holder and has near the other end a bearing surface bearing on a mating surface of the cutter body. By the radial force urging each tooth holder against the cutter body, each tooth holder is forced at both ends against the corresponding backing surfaces in snug contact therewith so that even a small radial force will ensure that the tooth holders will be reliably fixed and supported on large surfaces and will not be tilted in operation. Besides, each tooth holder contributes also to the fixation of the adjacent tooth holder so that all tooth holders retain each other and the peripheral cutting forces can be more easily taken up. Moreover, the mutual overlap of the tooth holders along the periphery of the cutter body permits a close spacing of the tooth holders so that the teeth can be mounted with a small pitch and the inserted tooth cutter can be provided with a large number of cutting teeth.

The tooth holders will be mounted in a particularly stable position if, in accordance with the invention, each tooth holder is provided with the shoulder-forming extension at that end which is the trailing end when the inserted tooth cutter is rotated in the intended sense. In that case the leading end of each tooth holder, i.e., the end which tends to be lifted by the tilting moment acting on the tooth holder during the cutting operation, will be forced down by the preceding tooth holder. As a result, each tooth holder will be held down not only by the fixing force exerted on the tooth holder but also by the tilting moment acting on the preceding tooth holder because that tilting moment will tend to tilt the tooth holder about its trailing end so that it will be more strongly forced against the associated backing surface in that region.

In accordance with a further feature of the invention each tooth holder is fixed in position by means of a fixing screw, which has been screwed from the cutter body into the tooth holder in the portion thereof which is disposed between the shoulder-forming extension and the bearing surface. Because each tooth holder is properly backed at both ends and the tilting moment is effectively taken up, a single fixing screw is sufficient, which may be connected to the tooth holder in that region thereof in which the tooth holder has the largest thickness, i.e., in the intermediate portion between the two bearing surfaces. Because that fixing screw is screwed into the tooth holder from the cutter body, the screw will readily be accessible. Said fixing screws can be arranged in a simple manner if they are inclined from a plane that is normal to the axis of the inserted tooth cutter.

In inserted tooth cutters for operations involving small cuting forces, e.g., for a machining of castings, the tooth holders can be adequately laterally supported for taking up axial components of force if each tooth holder is provided at an edge with a rib which engages a radial shoulder formed at an end face of the cutter body so that the inclined fixing screw ensures a snug contact between the edge rib and said shoulder of the cutter body. A more reliable lateral support of the tooth holders even for operations involving very strong cutting forces will be obtained if, in accordance with the invention, the cutter body is formed with a peripheral groove and each tooth holder has in an intermediate portion of its width a guide rib, which protrudes from the bearing surfaces of the tooth holder into said groove. In that case the tooth holder will be laterally supported by backing surfaces against forces in both axial direction. Whether the tooth holders are provided with the edge rib or with an intermediate guide rib, the cutter body will be provided in its remaining thickness with wide bearing surfaces for supporting each tooth holder in a radial direction.

The cutter body is desirably provided at its periphery with an annular series of sawtoothlike recesses for receiving the tooth holders. Each of said sawtoothlike recesses has a surface for backing a tooth holder at its bottom surface and a surface for backing the tooth holder at its trailing end. This arrangement ensures a positive joint for taking up cutting forces and an exact positioning. The bottom backing surface is inclined from the tangential direction and together with the substantially radial fixing force causes each tooth holder to be virtually selfcentering because a fixing force component is obtained which urges each tooth holder against the rear backing surface.

Figure 2:
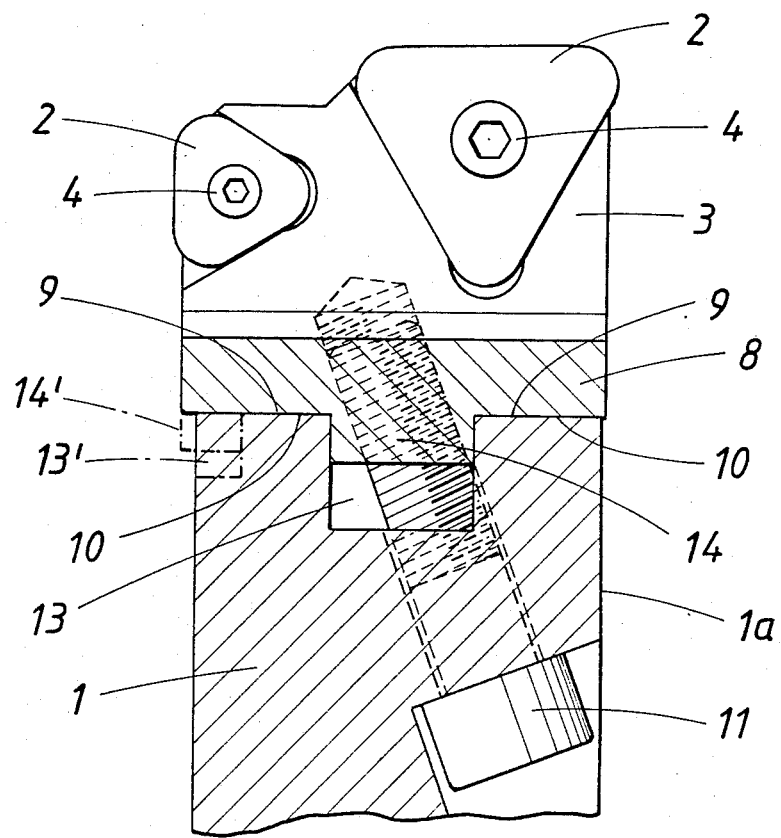

An embodiment of the invention is shown diagrammatically and by way of example on the drawing, in which FIG. 1 is a fragmentary end view showing part of an inserted tooth cutter in accordance with the invention and FIG. 2 is an axial section view taken on line II—II in FIG. 1.

FIG. 1 shows a portion of an inserted tooth cutter having a cutter body 1 in the shape of an annular disc. To permit the largest possible number of platelike cutting teeth 2 to be fixed in a comparatively small space on the cutter body 1, the cutter body 1 is provided at its periphery with an annular series of blocklike tooth holders 3. In the internally cutting inserted tooth cutter of the illustrated embodiment, the tooth holders 3 are provided on the inside peripheral surface of the disc-shaped cutter body. In an externally cutting inserted tooth cutter, the tooth holders may be similarly provided on the outside peripheral surface of the cutter body. The tooth plates 2 are snugly fitted in pockets formed in the tooth holders 3 and are fixed in the tooth holders by fixing screws 4. Each tooth holder 3 is mounted in one recess of an annular series 5 of sawtoothlike recesses 6, which are formed in the cutter body 1. Each tooth holder is provided at that end which is the trailing end when the inserted tooth cutter rotates in the intended direction with a shoulder-forming extension 7, which bears on a mating extension 8 provided on the next following tooth holder 3. Each tooth holder 3 is provided near its leading end with a bottom surface portion 9, which bears on a mating bottom surface portion 10 of the associated recess 6 formed in the cutter body 1. Each tooth holder 3 is fixed in position by a fixing screw 11, which lies in an axial plane and is inclined from a plane that is normal to the axis of the inserted tooth cutter. That screw has been screwed from one end face 1a of the cutter body into that portion of the tooth holder 3 which extends between the shoulder-forming extension 7 and the bottom surface portion 9.

Each tooth holder 3 is thus supported on opposite sides of the substantially radially extending fixing screw 4 by structurally simple means, which ensure a stable mounting of the tooth holder 3 and prevent it from tilting. A resistance to tilting which will meet even the most stringent requirements is ensured by the overlap between adjacent tooth holders. The provision of the cutter body with an annular series of sawtoothlike recesses 6 having rear backing surfaces 12 ensures that each tooth holder is backed by means which directly oppose the cutting forces and that the tooth holders 3 will be very exactly fixed in position.

To ensure that axial components of force will also be taken up by the means for mounting the tooth holders, the cutter body 1 is provided with a peripheral groove 13 and each tooth holder 3 is provided in an intermediate portion of its width with a guide rib 14 wich extends into and is axially retained in said groove. Forces exerted in both axial directions can reliably be taken up by that mounting and the symmetrical arrangement of the surfaces for backing each tooth holder 3 in a radial direction will be preserved. In inserted tooth cutters for operations involving relatively small cutting forces, each tooth holder 3 may be laterally supported by a peripheral edge rib 14', which is formed on the tooth holder 3 and bears on the cutter body 1 at a generally radially extending shoulder 13' formed at one end of said cutter body. Such an arrangement is indicated in phantom in FIG. 2.

What is claimed is:

1. In an inserted tooth cutter comprising
    a disc-shaped cutter body having an annular peripheral surface,
    an annular series of tooth holders provided on said annular peripheral surface and adapted to hold a plurality of platelike cutting teeth,
    a plurality of fixing elements, which are secured to said cutter body and each of which forces one of said tooth holders against said cutter body,
    the improvement residing in that
    each of said fixing elements forces one of said tooth holders against said cutter body in a generally radial direction,
    said cutter body is formed adjacent to said annular peripheral surface with a plurality of generally radially facing backing surfaces, each of which faces one of said tooth holders, and
    each of said tooth holders extends generally in the peripheral direction of said cutter body and is formed near one end with a generally radially facing bearing surface portion engaging one of said backing surface portions, and with a first longitudinal extension, and is formed at its other end with a second longitudinal extension, which forms a shoulder that radially faces said cutter body and peripherally overlaps and radially engages said first longitudinal extension of an adjacent tooth holder on the side thereof which is radially opposite to said cutter body.

2. The improvement set forth in claim 1 as applied to an inserted tooth cutter in which at least one tooth plate is fixed in each of said tooth holders.

3. The improvement set forth in claim 2 as applied to an inserted tooth cutter in which said tooth plates are arranged in said tooth holders to cut during a rotation of said cutter body in a predetermined sense, wherein
    each of said tooth holders is provided with said second longitudinal extension at that end which is the trailing end of said tooth holder during a rotation of said inserted tooth cutter in said predetermined sense.

4. The improvement set forth in claim 1, wherein
    each of said tooth holders has a portion disposed between said generally radially facing bearing surface and said second longitudinal extension and
    each of said fixing elements consists of a fixing screw which is screwed in said portion of the associated tooth holder.

5. The improvement set forth in claim 1, wherein
said cutter body is formed in said annular peripheral surface with a peripherally extending annular groove and each of said tooth holders is formed on the side facing said annular peripheral surface with a rib provided in an intermediate portion of the width of said tooth holder and extending into and being axially retained in said groove.

6. The improvement set forth in claim 1, wherein
said cutter body is formed in said annular peripheral surface with an annular series of sawtoothlike recesses and each of said tooth holders extends into one of said recesses.

7. The improvement set forth in claim 6, wherein each of said recesses has a generally radially facing bottom surface which constitutes one of said generally radially facing bearing surface portions.

8. The improvement set forth in claim 7, wherein
each of said recesses has a generally radially extending surface and each of said tooth holders has at said other end a generally radially extending surface in snug contact with said generally radially extending surface of the associated recess.

9. The improvement set forth in claim 8 as applied to an inserted tooth cutter in which said tooth plates are arranged in said tooth holders to cut during a rotation of said cutter body in a predetermined sense, wherein each of said tooth holders is provided with said second longitudinal extension at that end which is the trailing end of said tooth holder during a rotation of said inserted tooth cutter in said predetermined sense.

* * * * *